Patented Feb. 27, 1934

1,949,299

UNITED STATES PATENT OFFICE 1,949,299

SULPHURIC ESTER OF THE ANTHRA-QUINONE SERIES AND PROCESS SUITABLE FOR MAKING THE SAME

David Alexander Whyte Fairweather and John Thomas, Grangemouth, Scotland, assignors to Scottish Dyes, Limited, Grangemouth, Scotland No Drawing. Application November 12, 1928, Serial No. 318,997. In Great Britain November 18, 1927

8 Claims. (Cl. 260—98)

This invention relates to the production of sulphuric acid esters of amino-anthrahydroquinones.

The object of the invention is to provide a method for the production of the aforesaid bodies in good yields.

The invention consists in a process for the production of sulphuric acid esters of amino-anthrahydroquinones which comprises the treatment of acyl amino anthraquinones particularly anthraquinonyl urethanes by pyridine sulphur trioxide in the presence of a metal and a tertiary organic base, the hydrolysis of the resulting ester to remove the acyl group and if desired the conversion of the resulting products into their sodium or like salts.

The invention also consists in the application of the products of the preceding paragraph in the arts of dyeing and printing.

The invention further consists in processes substantially as herein described and in products when made by such processes or the obvious chemical equivalents thereof.

The following examples illustrate how the invention may be carried into effect reference to parts being to parts by weight:—

Example 1

12 parts of 2-acetyl-amino anthraquinone are mixed with 50 parts of dry pyridine and 25 parts of pyridine sulphuric anhydride, and the temperature raised while stirring to 90°. 8 parts of copper powder are then added and the melt is maintained at a temperature of 90° for one hour. It is then diluted with about 250 parts of water containing 13 parts of caustic soda and steam distilled to remove pyridine, the volume being kept approximately constant, and the hot solution then filtered from the copper residues. This solution contains the sodium salt of 2-acetyl-amino anthrahydroquinone sulphuric acid ester. To this solution are now added 10 parts of sodium hydroxide and the whole is boiled for one hour, whereby the acetyl group is removed, whilst the sulphuric acid groups remain substantially unaffected.

The formula of the final product is 2-amino-anthrahydroquinone-9:10-disulphuric ester disodium salt, namely

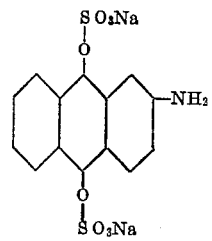

Textile fabrics impregnated with this solution are coloured a bright brownish yellow shade, which, on immersion in boiling acid copper sulphate solution, are converted to bright blue shades, which are very firmly fixed on the fibre.

Example 2

13.2 parts of 2-anthraquinonyl urethane are mixed with 50 parts of dry pyridine and 25 parts of pyridine-sulphuric-anhydride and the temperature raised to 90° with stirring. 8 parts of copper powder are then added and the melt is maintained at a temperature of 90° for one hour. It is then diluted with about 250 parts of water containing 13 parts of caustic soda and steam distilled to remove pyridine, the volume being kept approximately constant. The hot solution is then filtered from copper residues. This solution contains the sodium salt of 2-anthra-hydroquinonyl-urethane-disulphuric acid ester. 10 parts of caustic soda are added to it and the whole boiled for half an hour. The resulting solution contains the same end product as Example 1.

Textile fabrics impregnated with this solution are coloured a bright brownish-yellow shade, which, on immersion in a suitable oxidizing solution, for example boiling acid copper sulphate solution, are converted to bright blue shades which are firmly fixed on the fibre.

Example 3

12 parts of 1-acetyl-amino-anthraquinone are mixed with 50 parts of dry pyridine and 25 parts of pyridine-sulphuric anhydride and the temperature raised while stirring to 90°, 8 parts of copper powder are added and the temperature then maintained at 90° for one hour. The melt is treated with about 250 parts of water containing 13 parts of caustic soda and steam distilled to remove pyridine, keeping the volume approximately constant. The hot solution is filtered from copper residues and to it are added a further 10 parts of caustic soda solution. The solution is then boiled for one hour and the acetyl group apparently thus removed.

*Example 4*

13.5 parts of 2-acetyl-amino-3-chlor-anthraquinone are mixed with 50 parts of dry pyridine and 25 parts of pyridine-sulphuric-anhydride and the temperature raised with stirring to 90°. 8 parts of copper powder are then added, after which the melt is stirred at 90° for one hour. 13 parts of caustic soda and about 250 parts of water are then added and the pyridine removed by steam distillation as previously described. To the solution obtained by filtration are added 10 parts of sodium hydroxide, after which the solution is boiled for one hour and the acetyl group apparently thus removed.

*Example 5*

14.2 parts of 1-acetyl-methyl-amino-4-brom-anthraquinone are mixed with 50 parts of dry pyridine and 25 parts of pyridine-sulphuric-anhydride. To the clear solution is added at 90° 8 parts of copper. The melt is stirred at 90° for one hour and is then steam distilled after the addition of 13 parts of caustic soda in about 250 parts of water. The resulting solution is brown in colour with a greenish fluorescence. 15 parts of caustic soda are then added and the solution boiled for about 1 hour and the acetyl group apparently thus removed.

*General*

Apparently in the above examples the amino group of the anthraquinone body is suitably protected by acylation for a sufficient part of the process the acyl group subsequently being removed by the alkaline hydrolytic agent.

Acylating agents other than those referred to above may also be used for the purposes of the present invention, but they are not all equally effective, and, further, their effect may vary according to the position of the amino groups. Similarly, the ease with which the acylating group may be removed varies considerably.

Amongst anthraquinone derivatives containing protected amino groups which may be used for the conversion to anthrahydroquinone sulphuric acid esters and subsequent hydrolysis as described above, may be mentioned acetyl amino derivatives, benzoyl amino derivatives and urethanes.

Amino anthrahydroquinone sulphuric acid esters prepared as described above may be used as intermediates for the preparation of dyestuffs, and, in certain cases, may be used for the production of dyestuffs on the fibre. Thus the sulphuric acid ester obtained by the treatment of 2-acetyl-amino anthraquinone and subsequent removal of the acetyl group may be used to impregnate fibres, and the fibres thus impregnated may be then treated with a suitable acid oxidizing bath, preferably an acid solution of a cupric salt, whereby, a blue dyestuff, apparently of the indanthrone class, is deposited on the fibre.

Having now described our invention, what we claim as new and desire to secure by Letters Patent is:—

1. Alkali metal salts of 2-anthrahydroquinonyl-urethane-disulphuric acid ester.

2. The sodium salt of 2-anthrahydroquinonyl-urethane-disulphuric acid ester.

3. The process which consists in mixing 2-anthraquinonyl-urethane with pyridine and pyridine sulphuric anhydride, heating, mixing with copper powder, diluting with aqueous caustic alkali, and removing the pyridine.

4. A process for the production of sulphuric acid esters of anthraquinones which consists in heating together an acyl amino anthraquinone, pyridine sulphur trioxide, copper and pyridine at a temperature of about 90° C.

5. A method as claimed in claim 4 in which the starting materials are selected from the group consisting of 2-acetyl-amino-anthraquinone, 2-anthraquinonyl-urethane, 1-acetyl-amino-anthraquinone, and 1-acetyl-methyl-amino-4-brom-anthraquinone.

6. A process for the production of sulphuric esters of amino anthraquinones which consists in acylating the amino group of an amino anthraquinone, heating the product with pyridine sulphur trioxide copper and pyridine at a temperature of about 90° C. and then hydrolyzing the product for the removal of the acyl group.

7. A method as claimed in claim 6 in which hydrolysis is effected by an alkali.

8. A method as claimed in claim 6 in which the starting materials are selected from the group consisting of 2-acetyl-amino-anthraquinone, 2-anthraquinonyl-urethane, 1-acetyl-amino-anthraquinone, and 1-acetyl-methyl-amino-4-brom-anthraquinone.

DAVID ALEXANDER WHYTE FAIRWEATHER.
JOHN THOMAS.